US011958310B2

(12) United States Patent
Parker

(10) Patent No.: US 11,958,310 B2
(45) Date of Patent: Apr. 16, 2024

(54) BOOK BINDING ASSEMBLY METHOD

(71) Applicant: Kevin P. Parker, Berkeley, CA (US)

(72) Inventor: Kevin P. Parker, Berkeley, CA (US)

(73) Assignee: POWIS PARKER INC., Berkeley, CA (US)

( * ) Notice: Subject to any disclaimer, the term of this patent is extended or adjusted under 35 U.S.C. 154(b) by 0 days.

(21) Appl. No.: 18/122,663

(22) Filed: Mar. 16, 2023

(65) Prior Publication Data

US 2023/0264508 A1 Aug. 24, 2023

Related U.S. Application Data

(62) Division of application No. 17/522,194, filed on Nov. 9, 2021, now abandoned.

(51) Int. Cl.
*B42C 7/00* (2006.01)
*B42C 11/04* (2006.01)

(52) U.S. Cl.
CPC ................ *B42C 11/04* (2013.01); *B42C 7/00* (2013.01); *B42C 7/004* (2013.01); *B42C 7/005* (2013.01); *B42C 7/006* (2013.01)

(58) Field of Classification Search
CPC ........... B42C 7/00; B42C 7/004; B42C 7/005; B42C 7/006
USPC ............................................................ 412/17
See application file for complete search history.

(56) References Cited

U.S. PATENT DOCUMENTS 7,124,822 B2 11/2006 Parker et al.
2006/0120828 A1 * 6/2006 Kato ...................... B42D 3/002 412/20
2010/0226734 A1 * 9/2010 Parker .................... B42D 3/004 412/17

FOREIGN PATENT DOCUMENTS

WO WO-2006109611 A1 * 10/2006 ............... B42C 7/00

* cited by examiner

*Primary Examiner* — Kyle R Grabowski
(74) *Attorney, Agent, or Firm* — Philip A. Girard

(57) ABSTRACT

A method of providing a book binding assembly in the form of a stack of hardcovers for making hardcover books, with the hardcovers having pressure sensitive adhesives on both sides for securing a cover wrap onto the hardcovers. Liner sheets are disposed over the upper hardcover and intermediate the hardcovers of the stack to protect the various adhesive elements. The liner sheet is then used to accurately apply a cover wrap to the hardcover on which the liner sheet is disposed.

13 Claims, 7 Drawing Sheets

BOOK BINDING ASSEMBLY METHOD

BACKGROUND OF THE INVENTION

1. Field of the Invention

The present invention is generally related to the field of book binding and in particular to providing hardcover assemblies for books suitable for easy mounting of cover wraps.

2. Description of Related Art

Binding books utilizing desktop binding machines has become popular. Such books are frequently made using soft bound books incorporated into hardcovers which results in a very realistic simulated hardcover book. A final step in finishing hardcover bound books involves covering the book with a cover wrap which is frequently custom printed. It is important that the cover wrap be properly and accurately installed since minor misalignments can significantly detract from the appearance of the final product. U.S. Pat. No. 7,452,172 entitled METHOD OF MAKING AND APPLYING A HARDCOVER OVER-WRAP AND GUIDE APPARATUS (hereinafter the '172 patent) discloses one approach for applying hardcover over-wraps (sometimes referred to herein as "cover wrap") to a hardcover. The contents of the '172 patent are fully incorporated herein by reference.

As can be seen in the '172 patent (see FIGS. 18-27) a guide 60 is used to assist in accurately securing a cover wrap 80 to a hardcover book. Although this approach has been found to be successful, a user does not always have access to binding apparatus such as guide 60. As will become apparent to those skilled in the art upon a reading of the following Detailed Description of the Invention together with the drawings, the present invention relates to a method which enables an accurate application of a cover wrap so as to produce an attractive book without the need for special tools such as guide 60.

SUMMARY OF THE INVENTION

A book binding assembly method including providing a stack of identical hardcovers, with each of the hardcovers having an outer wrap layer of pressure sensitive adhesive on one side and an inner wrap layer of pressure sensitive adhesive on the other side is disclosed. Each of the outer wrap adhesives is covered by an identical liner sheet, with each liner sheet also covering the inner wrap adhesive disposed above the liner. Thus, the outer and inner wrap adhesives are protected by the liner sheets.

In addition, the liner sheets possess attributes which enable the sheets to be used to provides accurate placement of an cover wrap onto the underlying hardcover. Such attributes can include, for example, the position of the liner sheet over the underlying hardcover. As a further example, attributes can include the dimensions of the liner sheet.

DETAILED DESCRIPTION OF THE INVENTION

Figure 1:
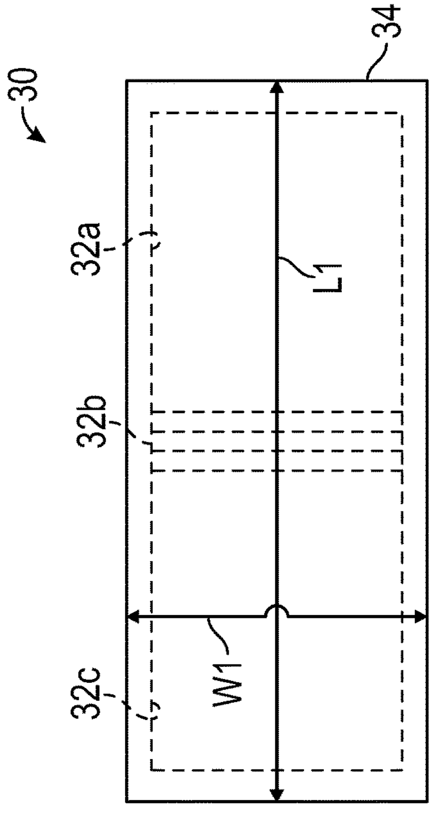
FIG. 1 is a top view one embodiment of a bookbinding assembly in a stack showing a liner sheet on top.
Figure 2:
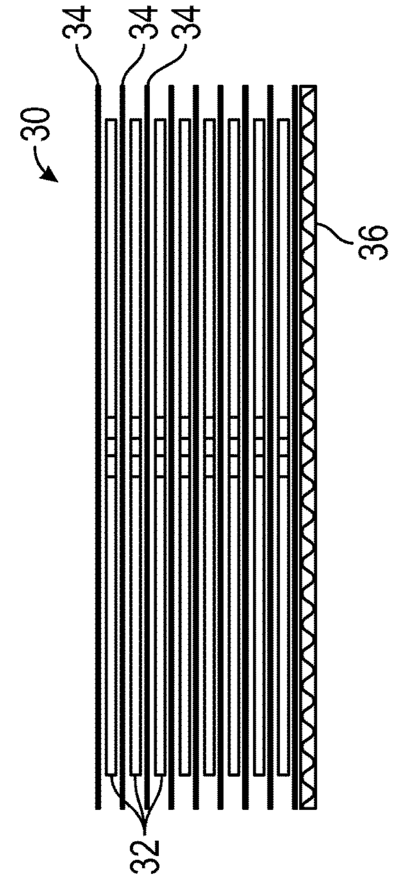
FIG. 2 is side view of the FIG. 1 assembly.

Referring to the drawings, FIGS. 1 and 2 depict a stack 30 of eight cover assemblies, with each cover assembly including a hardcover 32 and associated liner sheet 34. Each hardcover includes front and rear cover pieces 32*a* and 32*b* and an intermediate spine piece 32*c*. A hinging element (not depicted except schematically in FIGS. 2, 4, 6, 8, 10, 12, 14, and 16), secures the three pieces 32*a*, 32*b*, and 32*c* to form a hardcover. The outer surface of the front side of the hardcover is covered with a thin layer of pressure activated adhesive (not depicted in FIGS. 1-14 and designated by numeral 52 in FIG. 17) with this adhesive sometimes also referred to as the front adhesive layer. This adhesive functions to secure a central portion of a cover wrap 38 (see FIG. 9, e.g.) to the surface of the front side of the hardcover. Typically, the cover wrap 38 includes a title and other graphics which are preprinted. The back side of hardcover 32 includes a band 46 (FIGS. 15 and 17) of heat activated adhesive which extends around the periphery of the back side of the hardcover. This adhesive is sometimes referred to as the rear adhesive and functions to secure the wrapped edges of the peripheral portion of the cover wrap to the the backside of the hardcover. In FIGS. 1-14, the hardcovers 32 are disposed in stack 30 with the front adhesive layer facing up. It is anticipated that stack 30 would be mass produced and sold to an end user who would complete the book making process including the addition of a cover wrap as will be described.

As will be seen, once an end user has applied the cover wrap to the front side of the hardcover 32 covered by front adhesive layer 52, the edges of the cover wrap are folded around the edges of the hard cover 32 and held in place by the four bands 46 of the rear adhesive. Preferably, the edges of the hardcover are also covered with pressure sensitive adhesive 54 which functions to further secure the cover wrap folded around those edges (FIG. 17).

A first liner sheet 34 is disposed over the front adhesive layer 52 (FIG. 17) of the top most or first hardcover 32 in the stack in order to, among other things, protect the front adhesive layer from any unintended adhering. As is common with all liner sheets, a coating on the sheets prevents the sheets from strongly adhering to the pressure sensitive adhesive. However, there is some adhesion so that a selected position of the liner sheet on the underlying hardcover is maintained. A further or second liner sheet, substantially identical to the first and other liner sheets in stack 30, is disposed below the upper or first hardcover, contacting the rear adhesive 46 (FIG. 17) of the upper hardcover. Thus, the rear adhesive 46 of the top most or first hardcover is further protected from any unintended adhering. In addition, the second liner sheet is disposed over the front adhesive layer 52 of a second hardcover 32 [[disposed immediately below the further liner]] thus protecting that adhesive also. This arrangement continues for the remainder of the stack 30, with the last liner sheet being disposed intermediate the last hardcover and the bottom 36 of a shipping container. Since the various layers of pressure sensitive adhesive are somewhat tacky notwithstanding the presence of the liner sheets, the entire stack 30 will form a single integral unit which makes it convenient for shipping and handling by the end user.

In addition to the functions described above of the liner sheets 34, such sheets provide an important additional function. The special liner sheets are configured to assist the end user to achieve accurate placement of a cover wrap on the front side of a hardcover over which the liner sheet is disposed without the aid of alignment tools such as guide 60 disclosed in the '172 patent. In one embodiment as shown in FIGS. 1-12, the liner sheets 34 are dimensioned to track those dimensions of a cover wrap 38 designed to fit the hardcover on which the liner sheet is disposed. The cover wrap is sized to extend over the front side of the hardcover on which the front adhesive layer 52 is disposed and then around the edges of the hardcover and then over the pressure sensitive rear adhesive 46 (FIGS. 15 and 17) bands disposed on the back side of the hardcover 32.

Figure 17:
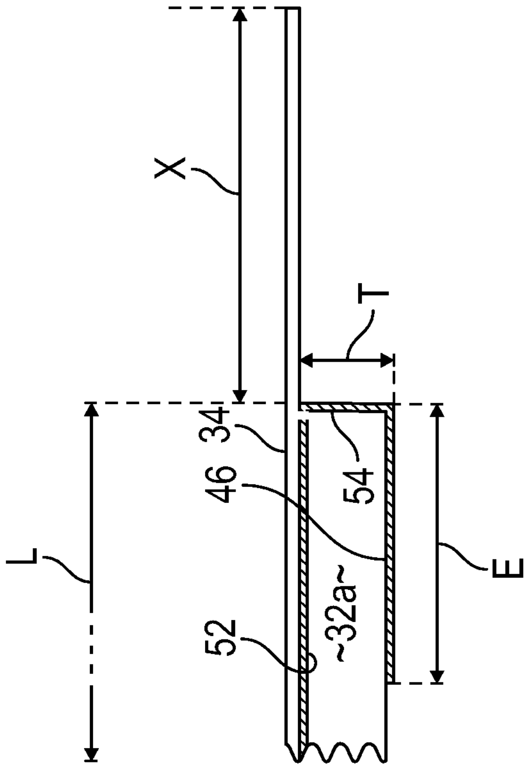
FIG. 17 is a partial view of an edge of a hardcover with a portion of a liner sheet extending past the edge.
Figure 20:
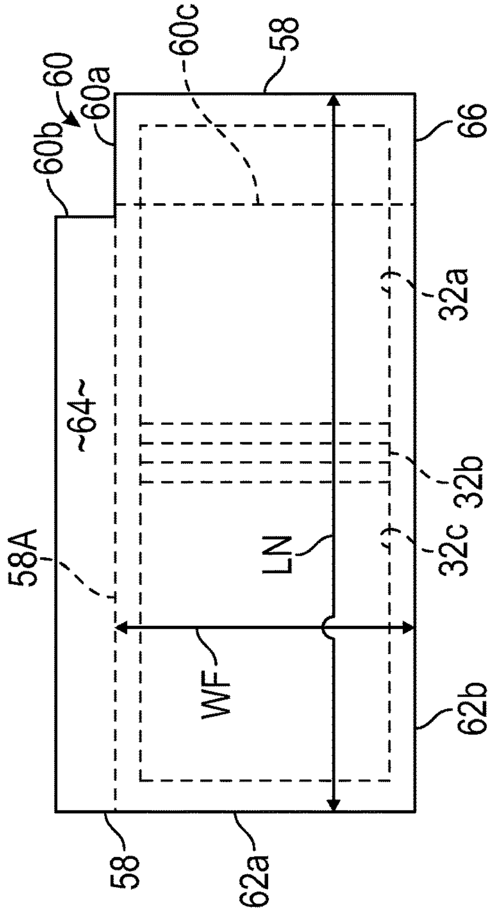
FIG. 20 is a top view of another embodiment of a bookbinding assembly in a stack showing a liner sheet over a hardcover.

Some details regarding the manner in which an appropriately sized liner sheet 34 in this embodiment extends past one edge of a front cover 32*a* of a hardcover 32 a distance X while the hardcover is still disposed in stack 30 is depicted in FIG. 17. In this case the total length L of the hardcover is measured normal to the spine and the total width W is measured in a direction parallel to the spine. An appropriately-sized cover wrap 38, and thus liner sheet 34, should have a length L plus twice the distance X needed to wrap the cover around the opposite edges of the hard cover. Distance X is equal to the sum of the thickness T of the hardcover (ignoring the thickness of the thin layers of adhesive) and distance E, the width of the rear adhesive band 46 on the backside of the hardcover, such as front cover 32*a*. Thus, the length L1 of liner sheet 34 (FIG. 1) should be L+2X or L+2T+2E taking into account two edges. Similarly, the width W1 of the liner sheet (FIG. 1) should be W+2T+2E. Note that during the manufacturing process, the liner sheets 34 are positioned on the hardcovers so that the liner sheets extend past the edges of the hardcovers by distance X on all four sides. The slight tackiness of the pressure adhesive will hold these two elements in place. In this embodiment, the liner sheet 34 is positioned on the hardcover at the final desired location of cover wrap, as will be described.

Figure 3:
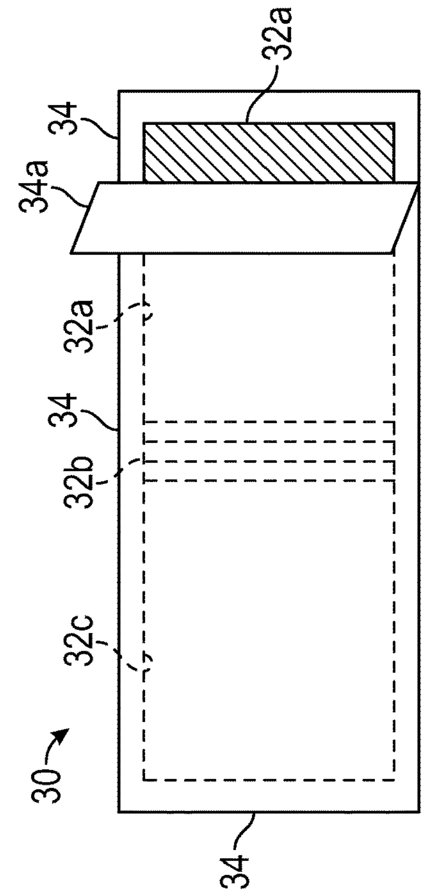
FIG. 3 is a top view of the FIG. 1 assembly showing liner sheet folded so as to expose a portion of the underlying adhesive on the hardcover.
Figure 4:
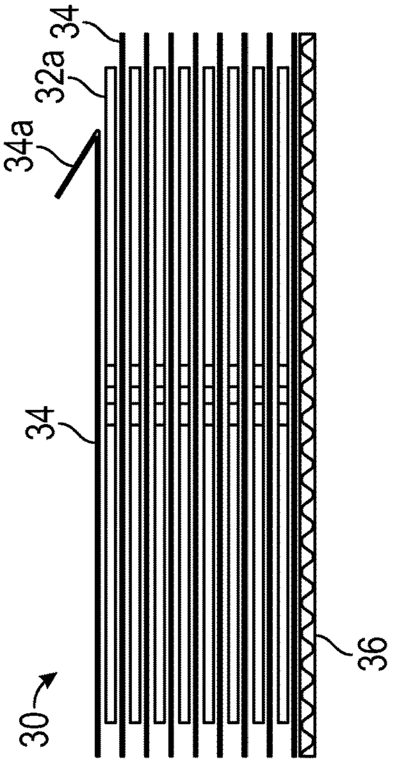
FIG. 4 is a side view of the FIG. 3 assembly.
Figure 7:
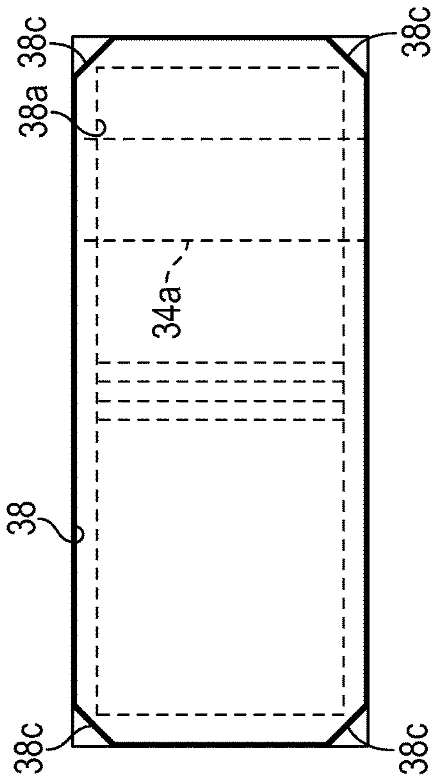
FIG. 7 is a top view of the FIG. 1 assembly showing the cover wrap partially attached to the hardcover, with the liner sheet serving as an alignment guide.

The process for accurately attaching a cover wrap to a hardcover will now be described. Referring to FIGS. 3 and 4, at this point the top most or first hardcover remains on the stack 30 thereby providing a stable working platform. The end user separates a small portion 34*a* of the top most or first liner sheet 34 from the underlying front adhesive layer 52 (FIG. 17) disposed on the front side of cover 32*a* of the hardcover 32. The lifted section 34*a* of the first liner sheet is then folded down as shown in FIG. 4 against the remainder of the liner sheet thereby exposing a portion of the front adhesive layer on cover 32*a*.

Figure 5:
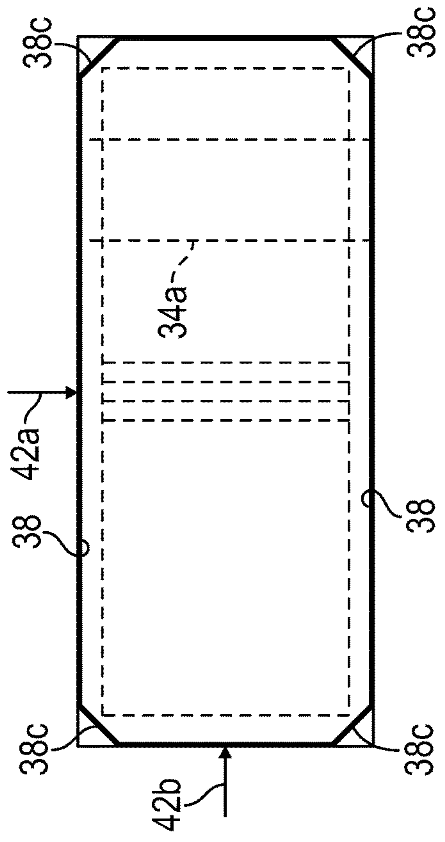
FIG. 5 is a top view of the FIG. 1 assembly showing a cover wrap over the liner sheet, with the under lying liner sheet still folded.
Figure 6:
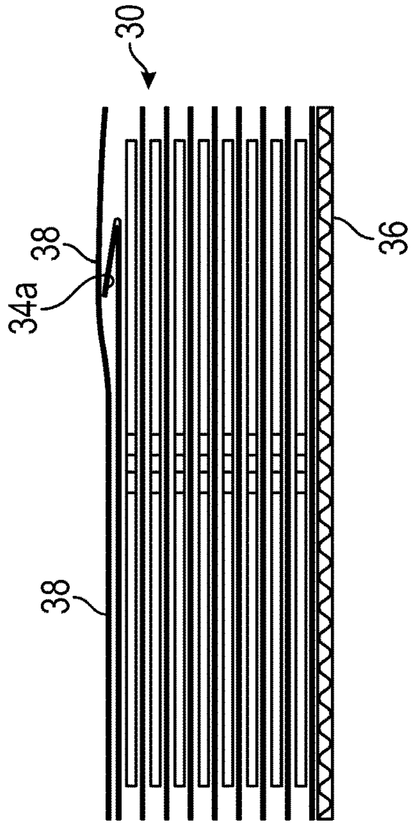
FIG. 6 is a side view of the FIG. 5 assembly.
Figure 11:
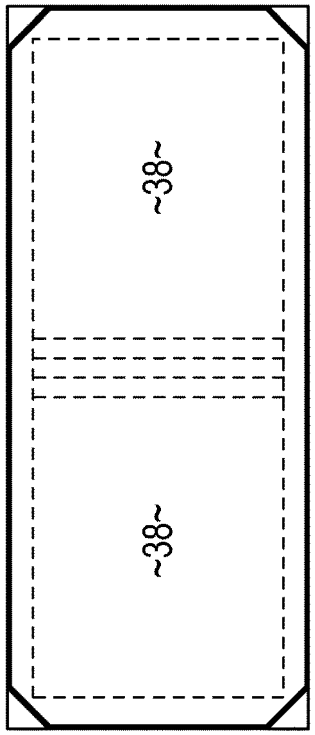
FIG. 11 is a top view of the FIG. 1 assembly showing the cover wrap secured to the upper surfaces of the hardcover
Figure 12:
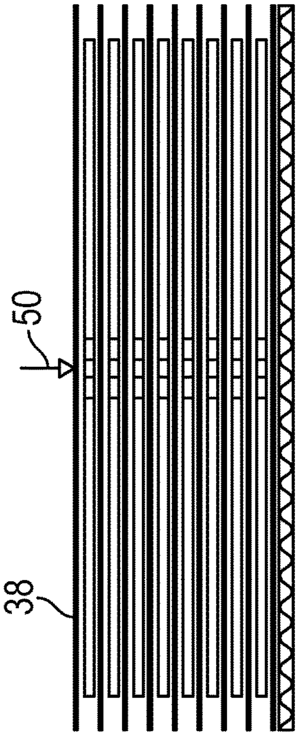
FIG. 12 is a side view of the FIG. 10 assembly.

Next, as shown in FIGS. 5 and 6, a properly sized cover wrap 38 is positioned over the first liner sheet 34, including folded section 34*a*. Care should be taken not to allow the cover wrap to contact the exposed portion of the front adhesive layer during this alignment. Note also that the alignment preferably takes place at an end of the cover wrap opposite the exposed adhesive, such as at the edges designated by arrows 42*a* and 42*b*. Once the respective edges of the cover wrap and the liner sheet are carefully aligned with one another, that is, once the orthogonal edges of liner sheet 34 are aligned with the corresponding orthogonal edges of cover wrap 38, the desired relative position of the cover wrap and liner sheet (and thus the first hardcover) is achieved.

Figure 8:
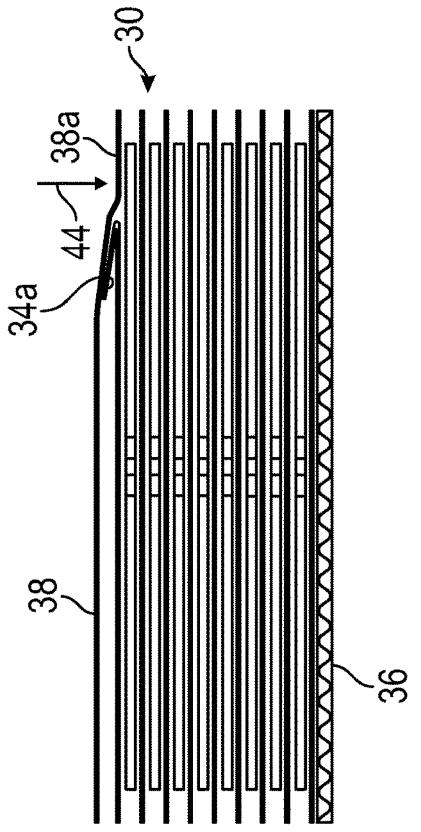
FIG. 8 is a side view of the FIG. 7 assembly.
Figure 9:
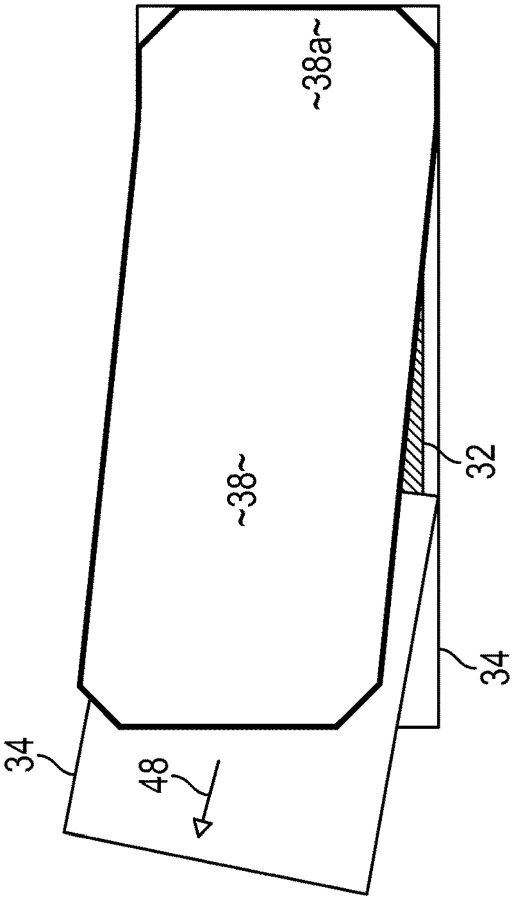
FIG. 9 is a top view of the FIG. 1 assembly showing final removal of the liner sheet while maintaining proper alignment of the cover wrap with the hardcover.
Figure 10:
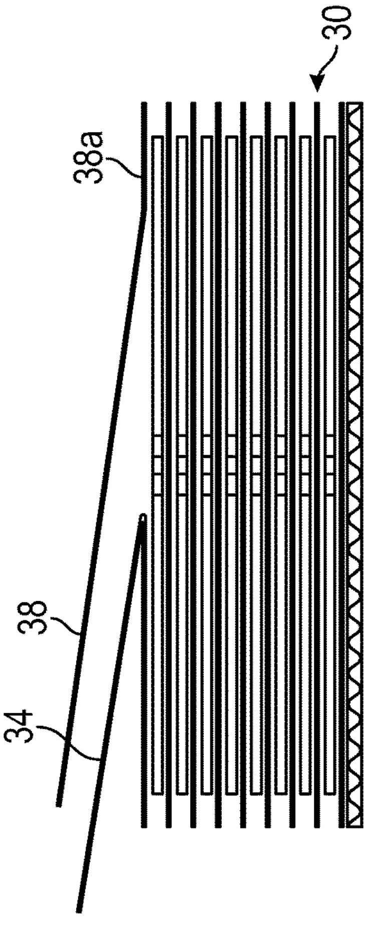
FIG. 10 is a side view of the FIG. 9 assembly.

With the cover wrap and first liner sheet held in place by one hand, the second hand is free to press down in the area of the cover wrap indicated by arrow 44 of FIG. 8. At this point, the correct relative position of the cover wrap and the first hardcover is secured by the exposed front adhesive layer [[disposed on front cover 32*a*]] in the area 38*a* of the hardcover. The user then removes the remaining portion of the liner sheet 34 by pulling on the sheet in the area indicated by arrow 48 of FIG. 9. Thus, in this embodiment and the other embodiments, the entire liner sheet 34 is removed in one piece. Next, the user presses the liner sheet against the newly exposed front adhesive layer on the hardcover, taking special care in the spine area as indicated by arrow 50 of FIG. 12. Note also at this point, the cover wrap 38 is centered on the hardcover 32, that is, the four edges of the cover wrap extend past the corresponding edges of the hardcover an equal distance. This precise centering of the cover wrap on the first hardcover is carried out exclusively utilizing the first liner sheet so no other apparatus such as guide 60 of the prior art '172 patent is needed. Note further that at this point, the hardcover is still positioned on the stack thereby maintaining a stable work surface. Care is taken to ensure that all regions of the cover wrap are smoothly pressed against the hardcover. A small hand tool can be used to assist in this smoothing process.

Figure 15:
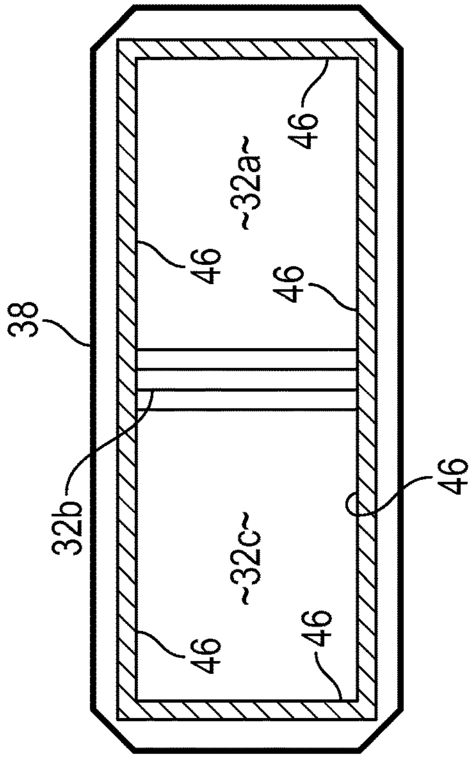
FIG. 15 shows the FIG. 13 assembly flipped over revealing the unattached edges of the outer wrap.
Figure 16:
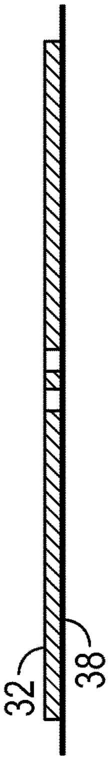
FIG. 16 is a side view of the FIG. 15 assembly.
Figure 13:
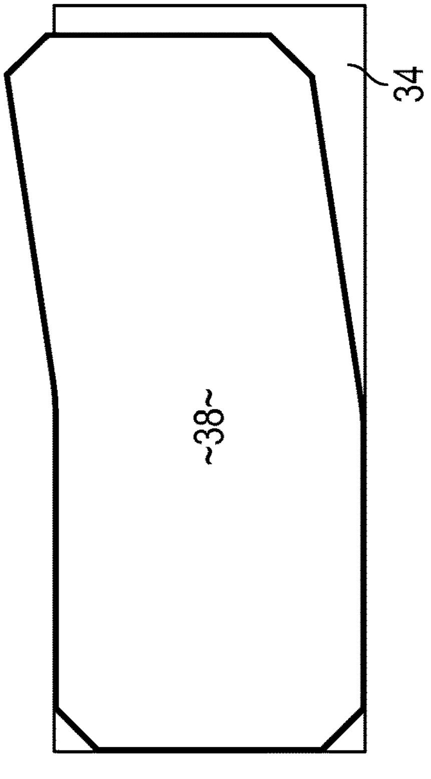
FIG. 13 is a top view of the FIG. 1 assembly with the covered hardcover being lifted from the stack.
Figure 14:
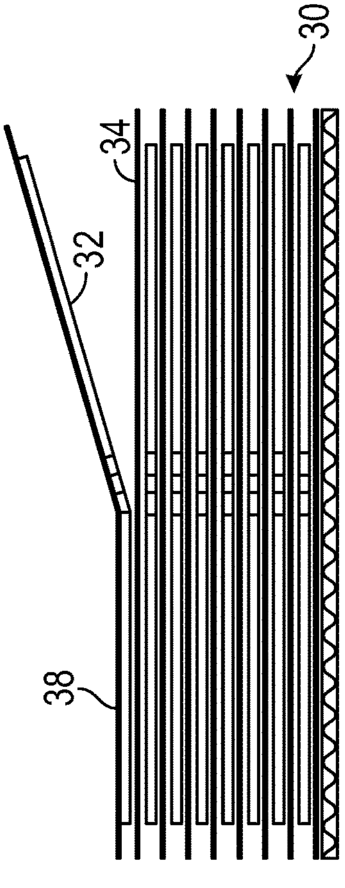
FIG. 14 is a side view of the FIG. 13 assembly.
Figure 18:
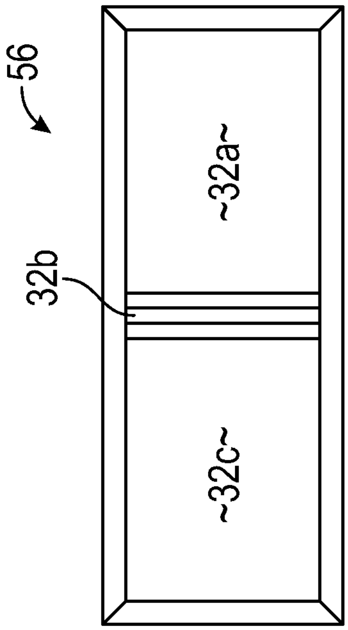
FIG. 18 is a top view of the FIG. 15 hardcover showing the covering process completed.
Figure 19:
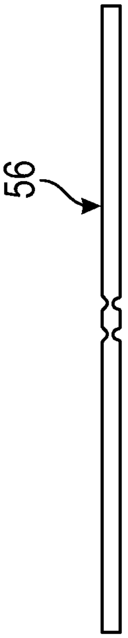
FIG. 19 is a side view of the FIG. 18 hardcover.

At this point the hardcover/cover wrap arrangement is lifted away from stack 30, as shown in FIGS. 13 and 14, with the underlying or second liner sheet 34 minimizing the force required. Note that this underlying second liner sheet 34 remains on stack 30 at this point, covering the front adhesive layer on the underlying second hardcover. The lifted away hardcover/cover wrap arrangement is then flipped over and placed on a flat surface as shown in FIGS. 15 and 16. The four edges of the cover wrap are then manually folded around the respective edges of the first hardcover and secured in place by the various sections of the rear adhesive 46. This final process is well known in the art. One approach is to press one edge of the hardcover, along with the section of the adjacent cover wrap, against a flat surface and then rotate the hardcover so as to partially fold the cover wrap around the hardcover edge. Note that the four chamfers 38C (FIG. 5) located in the corners of the cover wrap facilitate this folding and provide the desired finished look. The user then manually finishes the wrap around process until the edge of the cover wrap is covering the associated inner wrap adhesive 46 segment. These steps are repeated for the remaining three hardcover edges thereby completing the accurate securing of the cover wrap 38 to the hardcover 32 as shown in FIGS. 18 and 19 which show the final hardcover 56. As before, no special tools, other than possibly a small hand held smoothing tool, are required to complete the process. This sequence can then be repeated, with the newly-exposed second liner sheet 34 being utilized to accurately position another cover wrap on the front side of the second hardcover 32 and so forth for the remaining hardcover/liner sheet combinations in stack 30.

It can be seen that the above-described method of providing a combination of hardcovers and liner sheets and applying a cover wrap to the hardcover results in a binding product that allows for the production of an attractive hardcover book without the use of special tools, with the possible exception of the actual binding itself. Even in that case, well known techniques allow the binding to be carried out with only basic tools. The disclosed liner sheets provide not only the function of protecting the various pressure sensitive adhesives on the hardcovers from unintended adhesion, but also the function of guiding an end user in accurate placement of a cover wrap over the hardcover. To this end, the liner sheet is configured to include certain attributes to assist in achieving this end. In the above-described embodiment, these attributes include certain dimensions of the hardcover such as the length L and width W. Those dimensions may also include values T and E as also described above. In addition, it can be seen that the position of the liner sheet over the hardcover during manufacture is an attribute of the liner sheet which also contributes to the proper alignment of the cover wrap and the hardcover.

Figure 21:
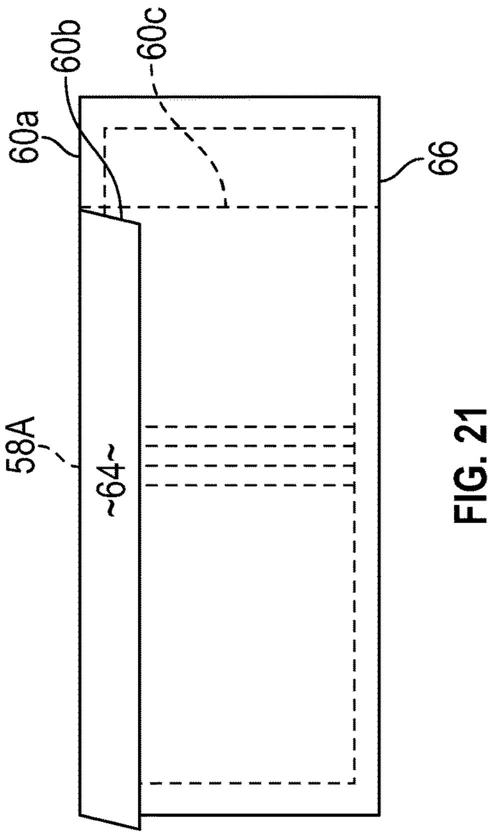
FIG. 21 is another top view of the FIG. 20 assembly with a fold formed in the liner sheet to assist in aligning an outer wrap over the hardcover.
Figure 22:
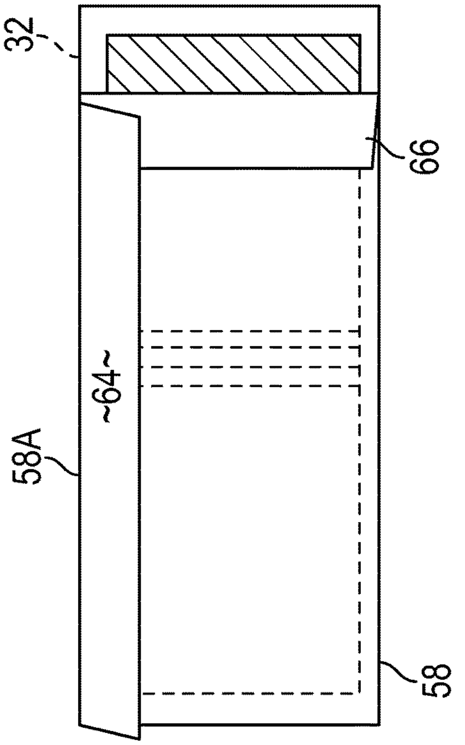
FIG. 22 is further top view of the FIG. 20 assembly with another fold in the liner sheet to expose a portion of the hardcover adhesive.

A further embodiment hardcover 32 and associated liner sheet 58 is shown in stack form in FIGS. 20-23. Liner sheet 58 has a generally rectangular form, with a notch 60 located in one corner. The liner sheet includes a fold line 58A which is spaced a distance WF from an opposite edge of the sheet. The liner sheet can be actually folded along line 58A during manufacture or perforations can be provided to assist in folding along the line by the end user. Distance WF is the same value as previously described distance W1, namely W+2T+2E where W is again the width of the hardcover and T and E are, respectively, the thickness of the hardcover and the width of the rear adhesive band 46 as shown in FIG. 17. The length LN of liner sheet 58 is not critical provided the liner sheet extends past the edge of the underlying hardcover so as to cover the front adhesive and so as to provide an region so that a user can grip the end of the sheet. Note that line 60C represents an ideal location to fold an end of the liner sheet to form a flap (FIG. 22). The location of line 60C is not critical, but is ideally slightly offset from notch edge 60*b* so as to facilitate various folding steps. Note that fold line 58A is preferably aligned with edge 60*a* of notch 60. Liner 58 is positioned over the hardcover, and held in place there by the slightly tacky adhesion between the liner sheet and the pressure sensitive adhesive during manufacture so that the distance between edge 62*a* of the liner sheet and the edge of the hardcover is value X or E+T (FIG. 17). The distance between edge 62*b* of the liner sheet and the edge of the hardcover is also set during manufacture to value X.

In order to apply a cover wrap 38, the end user leaves the top liner sheet 58 and underlying hardcover 32 on the top of the stack so that, once again, the stack will provide a stable work surface. In the event that the liner sheet was not folded during manufacture, the end user carefully folds the liner sheet, preferably using perforations located along line 58A, to produce a flap member 64 as shown in FIG. 21. Next, the end of liner sheet is folded near line 60C to reveal a section of exposed front adhesive layer located on the front side of the hardcover. The resultant flap 66 is tucked under flap 64 as shown in FIG. 22. Note that the slight displacement between notch edge 64*b* and line 60*c* (FIG. 20) keeps flaps 64 and 66 from interfering from one another during this operation.

Figure 23:
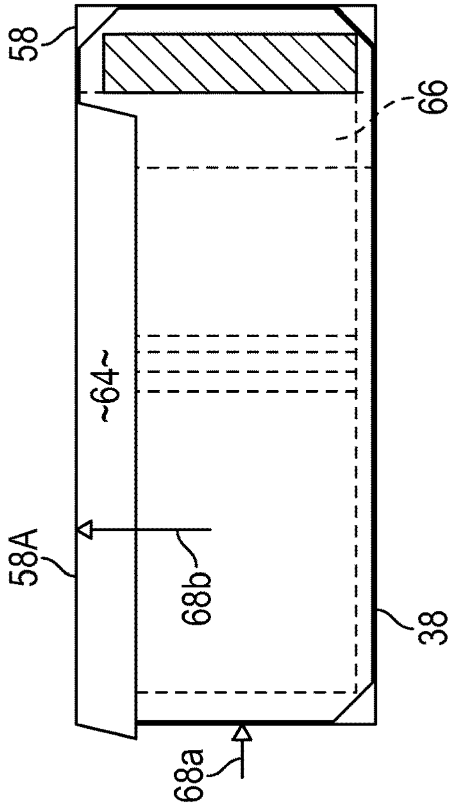
FIG. 23 is a still further top view of the FIG. 20 assembly showing a cover wrap disposed in the fold to assist in aligning the cover wrap over the hardcover.

The cover wrap 38 is then positioned on the liner sheet 58 as depicted in FIG. 23 taking care to not allow the sheet to contact the small portion of the exposed hardcover adhesive. The cover wrap is positioned over the folded flap 66 at this point. A long edge of the cover wrap 38 is then positioned under flap 64 until the edge is disposed along the entire length of fold line 58A as represented by arrow 68*b*. Since the edge of the cover wrap 38 is somewhat wedged in place between flap 64 and the underlying liner sheet, the cover wrap tends to stay in place adjacent the fold line 58A while permitting lateral movement of the cover wrap. An edge of the cover wrap 38 is then moved laterally until it is aligned with an edge of the liner sheet 58 (or hardcover 32) as indicated by arrow 68*a* of FIG. 23. With both locations 68*a* and 68*b* aligned, that is orthogonal edges of liner sheet 58, including the folded edge along fold line 58A, are aligned with the respective orthogonal edges of cover wrap 38, a correct positioning of the cover wrap 38 over the liner sheet, and hence over the hardcover, is achieved. The user then maintains this position by pressing down on flap 64 with one hand. The user then, using the other hand, forces that portion of the cover wrap extending over the exposed adhesive down against the adhesive thereby securing the cover wrap and the hardcover together with the correct alignment. The user then removes the last of the liner sheet so that the remaining hardcover 32 front adhesive layer is exposed. The user then proceeds to complete the process of securing the cover wrap as previously described in connection with the first embodiment.

Figure 26:
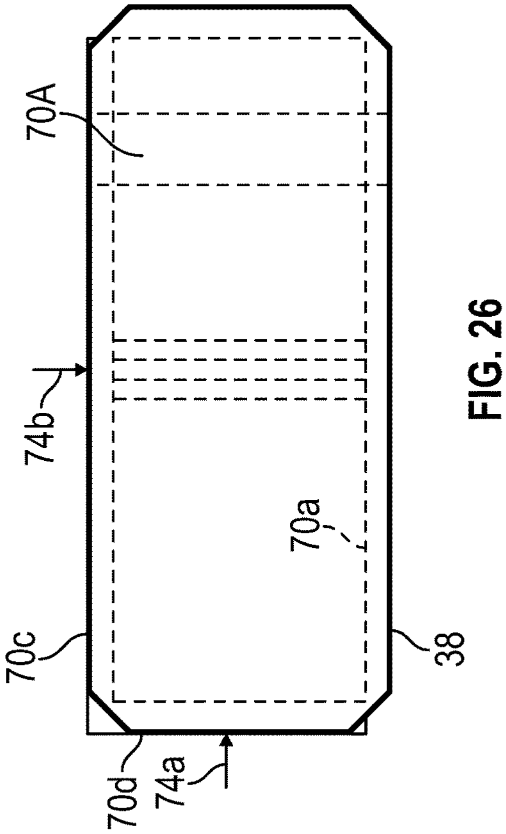
FIG. 26 is a top view of the FIG. 24 assembly showing a cover wrap secured to the exposed adhesive segment of FIG. 25 thereby fixing the cover wrap alignment on the hardcover.
Figure 24:
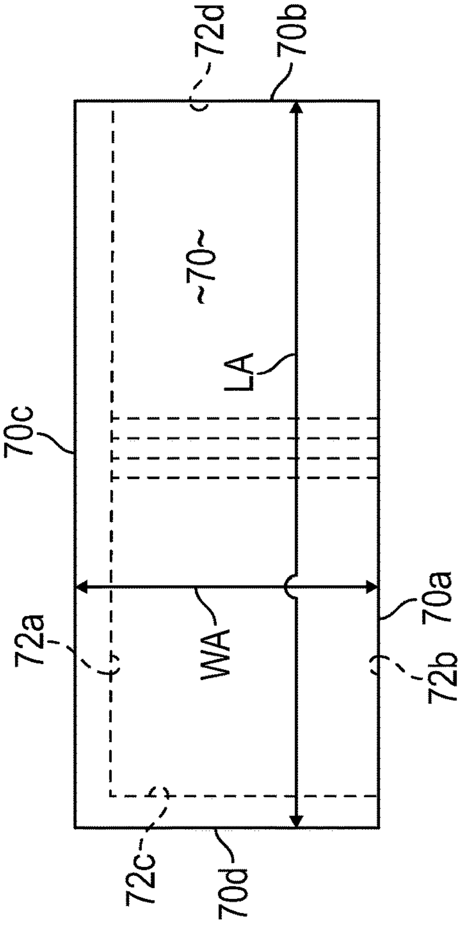
FIG. 24 is a top view of a further embodiment of a bookbinding assembly in a stack showing a liner sheet over a hardcover.
Figure 25:
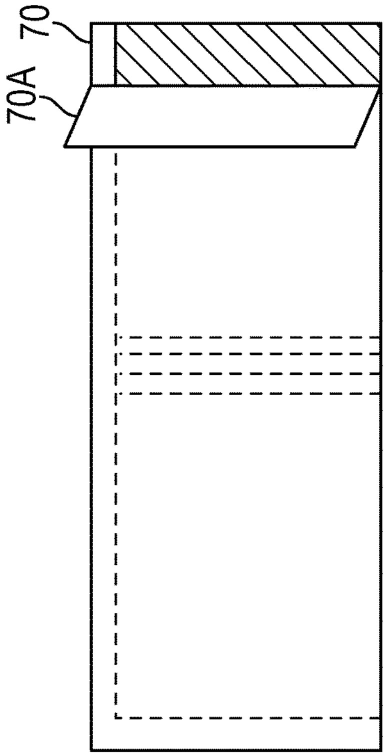
FIG. 25 is a top view of the FIG. 24 assembly showing the liner sheet pulled partially back to expose a segment of adhesive on the hardcover.

FIGS. 24-26 show a further embodiment of a hardcover/liner sheet arrangement. In this case, the arrangement is manufactured such that liner sheet 70 is positioned on the hardcover 32 such that edge 70*b* of the liner sheet is aligned with edge 72*d* of the hardcover. Similarly, edge 70*a* of the liner sheet is aligned with edge 72*b* of the hardcover. In order for the liner sheet to provide the desired guide function with this position, the liner sheet edge 70*c* should extend a distance past the hardcover edge 72*a* of T+E, where values T and E were previously explained in connection with FIG. 17. Also, the liner sheet edge 70*d* should extend past the edge 72*c* a distance of T+E. Thus, the width WA of liner sheet 70 is substantially equal to W+T+E and the length LA is substantially equal to L+T+E. (As previously noted, values W and L represent the width and length, respectively, of the hardcover.)

As shown in FIG. 25, the user then exposes a region of the front adhesive layer on the hardcover by lifting a section 70A of the liner away from the hardcover. The lifted section forms a flap 70A that is folded flat against the remainder of the liner sheet. Next, the cover wrap 38 is positioned over the liner sheet 70 with orthogonal edges of the liner 70*b* and 70*a* being aligned with the corresponding orthogonal edges of the cover wrap (not designated). These alignment points are designated by arrows 74*a* and 74*b*. Note also that the cover wrap edge extends past the corresponding edge 70*a* of the liner sheet for this embodiment. When achieving this alignment, care must be taken not to contact the exposed adhesive. Once the alignment has been made, the cover wrap is held in place to maintain the alignment by way of the exposed adhesive. The liner sheet is then completely removed thereby exposing the remainder of the adhesive. The cover wrap is then presses against the front adhesive layer over the full surface of the hardcover as previously described. The edges are then finished as also previously described thereby completing the process.

As described above, a method of providing various embodiments of bookbinding assemblies and applying a cover wrap to the assemblies have been disclosed which enable an end user to accurately position a cover wrap on a hardcover without the need for specialized tools such as alignment guides. Although this method has been described in some detail, it is to be understood that various changes can be made by those skilled in the art after reading the above Detailed Description of the Invention together with the drawings without departing from the spirit and scope of the invention as defined by the appended claims.

What is claimed is:

1. A method of applying cover wraps to hardcovers comprising the following:

a. providing a book binding assembly including
   i. a plurality of substantially identical liner sheets, with the liner sheets possessing orthogonal edges;
   ii. a plurality of substantially identical hardcovers, with the hardcovers comprising a front cover piece, a rear cover piece and a spine piece, with the hardcovers including a front adhesive layer disposed on a front side of the hardcover to form a surface for receiving a central portion of a cover wrap and a rear adhesive disposed on a back side of the hardcover, opposite the front side, for receiving a peripheral portion of a cover wrap, with a first one of the liner sheets disposed over a first one of the hardcovers and contacting the front adhesive layer of the first hardcover and with a second one of the liner sheets disposed intermediate the first hardcover and a second one of the hardcovers and contacting the rear adhesive of the first hardcover and the front adhesive layer of the second hardcover;

b. centering a first cover wrap on a front side of the first hardcover by aligning the orthogonal edges of the first liner sheet with respective orthogonal edges of the first cover wrap: and c. securing the first cover wrap to the first hardcover.

2. The method of claim 1 wherein, subsequent to the centering of the first cover wrap, separating the first liner sheet from the front adhesive layer of the first hardcover.

3. The method of claim 2 wherein the separating includes removing the entire first liner sheet from between the first cover wrap and first hardcover in a single piece.

4. The method of claim 2 wherein the separating includes a. lifting a portion of the first liner sheet from the first hardcover so as to expose only a portion of the underlying front adhesive layer;

b. partially securing the centered cover wrap to the hardcover by way of the exposed portion of the front adhesive layer;

c. removing the first liner sheet from the first hardcover so as to expose a remaining portion of the underlying front adhesive layer.

5. The method of claim 4 wherein, subsequent to the separating of the first liner sheet, removing the first hardcover from the bookbinding assembly, leaving the second liner sheet on the bookbinding assembly.

6. The method of claim 5 wherein, subsequent to the removing, wrapping edges of the centered first cover wrap around edges of the first hardcover and securing the edges of the first cover wrap to the first hardcover by way of the rear adhesive of the first hardcover.

7. The method of claim 1 wherein prior to the centering the first cover wrap, the liner sheets of the bookbinding assembly are centered with respect to the hardcovers.

8. The method of claim 7 wherein the hardcovers have a width W, a length L and a thickness T and the rear adhesive on the hardcovers extends a distance E from edges of the hardcover, wherein the liner sheets have a width W+T+E and a length L+T+E so that, prior to the centering of the first cover wrap, the liner sheets extend a distance T+E past edges of the hardcovers.

9. The method of claim 1 wherein the centering the first cover wrap on the first hardcover is carried out utilizing the first liner sheet and no other apparatus.

10. A method of applying cover wraps to hardcovers comprising the following:

a. providing a book binding assembly including
   i. a plurality of substantially identical liner sheets;
   ii. a plurality of substantially identical hardcovers, with the hardcovers comprising a front cover piece, a rear cover piece and a spine piece with the front cover, rear cover and spine pieces interconnected together, with the hardcovers including a front adhesive layer disposed on a front side of the hardcover to form a surface for receiving a central portion of a cover wrap and a rear adhesive disposed on a back side of the hardcover, opposite the front side, to receive a peripheral portion of a cover wrap, with a first one of the liner sheets disposed over a first one of the hardcovers and contacting the front adhesive layer of the first hardcover and with a second one of the liner sheets disposed intermediate the first hardcover and a second one of hardcovers and contacting the rear adhesive of the first hardcover and the front adhesive layer of the second hardcover;

b. centering a first cover wrap on the front side of the first hardcover utilizing the first liner sheet;

c. securing the first cover wrap to the first hardcover by way of the front adhesive layer on the front side of the first hardcover;

d. centering a second cover wrap on the front side of the second hardcover utilizing the second liner sheet; and e. securing the second cover wrap to the second hardcover by way of the front adhesive layer on the front side of the second hardcover.

11. The method of claim 10 where the centering of the first cover wrap and the centering of the second cover wrap are carried out with no apparatus other than the respective first and second liner sheets.

12. The method of claim 11 wherein, subsequent to the centering of the first cover wrap, removing the entire first liner sheet from the first hardcover in a single piece and subsequent to the centering of the second cover wrap, removing the entire second liner sheet from the second hardcover in a single piece.

13. The method of claim 11 wherein the liner sheets and the cover wraps possess orthogonal edges and wherein the centering of the first cover wrap includes aligning the orthogonal edges of the first liner sheet with the orthogonal edges of the first cover wrap and wherein the centering of the second cover wrap includes aligning the orthogonal edges of the second liner sheet with the orthogonal edges of the second cover wrap.

* * * * *